April 19, 1927.  
R. H. THORNE  
1,625,508  
LAMINATED PACKING AND METHOD OF FORMING THE SAME  
Filed Dec. 30, 1921
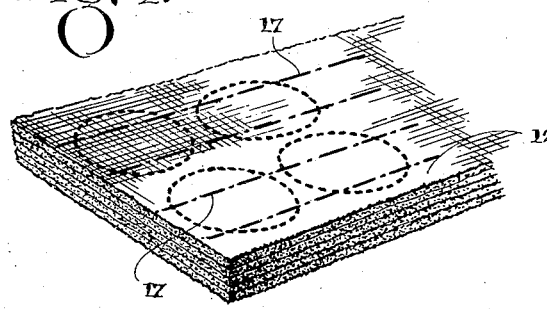
Fig. 1.
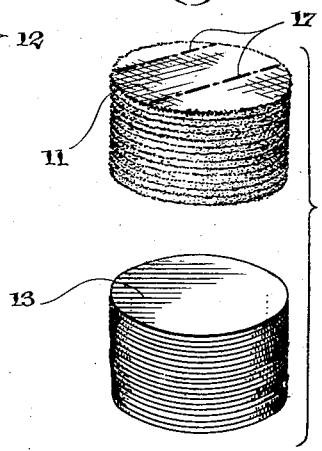
Fig. 2.
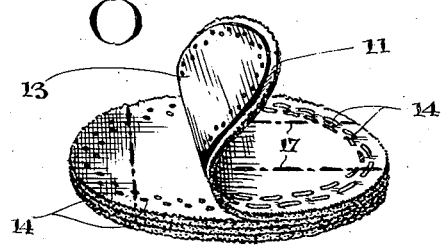
Fig. 3.
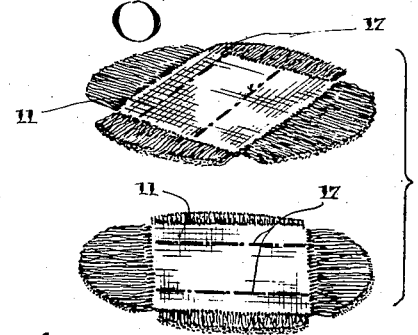
Fig. 6.
Fig. 4.
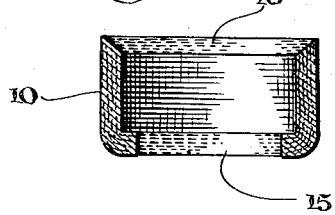
Fig. 5.
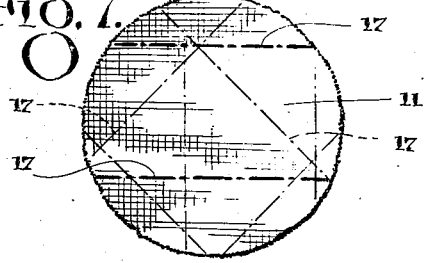
Fig. 7.
WITNESSES
INVENTOR
ROBERT H. THORNE.
BY
ATTORNEYS Patented Apr. 19, 1927.

1,625,508

UNITED STATES PATENT OFFICE.

ROBERT HARRY THORNE, OF WILLIAMSPORT, PENNSYLVANIA.

LAMINATED PACKING AND METHOD OF FORMING THE SAME.

Application filed December 30, 1921. Serial No. 525,822.

My invention relates generally to laminated packing, and more particularly to laminated packing as utilized in packing cups for pistons or plungers, my object generally being the promotion of a construction as well as the method of forming a packing of this character which will avoid crinkling of the finished product due to undue stretching of the fabric material of which it is formed, and to avoid the present difficulty with respect to ravelling of the threads of the fabric material in the course of manufacture.

Generally speaking, the present method of forming an article from which the present invention relates, consists of superimposing layers of fabric alternately with layers of unvulcanized rubber, then temporarily attaching the several layers to one another, applying great pressure thereto in order to force the rubber through the interstices of the woven fabric material, then die-pressing the adhering layers to the desired form of the packing, then vulcanizing the packing and finally punching and trimming.

In this process the layers of fabric material are superimposed in a promiscuous manner in so far as the run of the threads of the material of which the layers are formed is considered, and the result is that a considerable portion of finally imperfect product due to crinkling, which I have found to result from the unequal stretching of the fabric material during the die-pressing operation. There is, furthermore, a considerable disadvantage at present in that when the layers are attached, as well as during the subsequent steps before vulcanization, there is considerable danger of excessive ravelling at the edges of the layers likely to result in a weakened edge in the final product where the greatest possible strength is desired.

My invention avoids these disadvantages in the manner which I will proceed to describe with reference to the accompanying drawing forming a part of this specification, and wherein:—

Figure 1 is a perspective view showing sections of material from which the layers are cut;

Figure 2 is a perspective view showing a series of layers of fabric and unvulcanized rubber before their alternating arrangement;

Figure 3 is a perspective view showing the arrangement of alternate layers of fabric and rubber as well as the manner in which they are temporarily connected before being vulcanized;

Figure 4 is a cross section through a portion of Figure 3;

Figure 5 is a section taken diametrically through the finished packing;

Figure 6 is a perspective view showing a pair of layers with their edges unravelled, and Figure 7 is a top plan view showing in particular the manner in which the layers are superimposed according to my invention.

The method of forming laminated vulcanized packing of the type shown in Figure 5, and in the nature of a packing cup 10 for pistons, involves the cutting of circular sections of fabric such as indicated at 11, in Figure 2, from woven fabric material 12, as indicated in Figure 1, and also the cutting of slightly smaller circular sections 13 of unvulcanized rubber. The cup sections 11 of the fabric are then superimposed in desired number upon one another with interposed and alternating layers 13 of rubber in the manner seen in Figure 3, and the several alternating layers are then temporarily attached by stitching, as for instance a circular row of stitches 14, seen in Figure 3, and also in Figure 4. The body of the packing is thus formed and is then placed under high pressure sufficient to force the rubber through the interstices of the woven fabric so as to form a substantially homogeneous mass, which is then pressed to the ultimate form of the desired packing 10 by the use of dies and subsequently vulcanized, the central portion being cut away to form a rod or valve body receiving aperture 15, and the opposite edge being cut and trimmed to form the bevel 16.

This process as at present carried out and as above stated, is open to certain objections, one being the rather high percentage of imperfect products due to crinkling of the wall of the finished packing 10 arising from the unequal stretching of the fabric layers 11 during the die-pressing operation, and another being the susceptibility of the edges of the fabric edges of the section 11 to unravelling while they are being assembled as in Figure 3, and in fact subsequent to this assembly and at any time before vulcanization. This latter disadvantage results frequently in a weakened bevelled edge 16 upon the finished product where great strength is particularly desired.

According to my invention, material 12, of which the layers 11 are initially cut, is woven in the first instance with threads preferably warped threads 17 of a distinctive readily visible color different from that of the other threads, so as to thus provide means whereby the run of the threads is apparent, these distinctively colored threads 17 occurring at sufficiently frequent intervals to insure at least two distinctive threads in each of the disks or layers 11, as will be apparent from the inspection of Figs. 2, 3, 6 and 7.

In superposing the layers 11 with the interposed layers of rubber 13 the layers 11 are so disposed in relation to one another that the distinctively colored threads 17 in successive layers are disposed at angles with respect to one another, this being obvious from an inspection of Figs. 3 and 7, the latter of which in particular indicates by broken lines the directions of extension of the threads of the successive layers of the series. In this way the run of the threads of the successive layers being turned in different directions, the stretching of the connected layers, especially when the rubber has been thoroughly dispersed through and between the threads thereof during the pressure operation, is evenly distributed so that during the die-pressing operation this even stretching entirely around the packing body will avoid the frequent crinkling now encountered in view of the unequal stretching on account of the superposing of layers having the run of the threads parallel throughout the body.

Moreover, it is obvious that where layers are superimposed with the run of the threads in the same direction they are readily susceptible to unravelling of the edges as indicated in Figure 6, which is defeated where they are superimposed according to my invention as just above described.

By thus avoiding crinkling I do away with considerable waste encountered at present and the necessity of discarding imperfect products, and by avoiding of ravelling of the edges I insure the presence of a bevelled edge 16 on the finished product having maximum strength after cutting and trimming.

I claim:—

A method of forming laminated packing which consists in utilizing fabric layers having distinguishingly colored threads constituting visible means indicating the run of the threads thereof, superimposing the layers with alternate layers of unvulcanized rubber and with the run of the threads of each of the several layers as shown by said indicating means is at an angle to those of the several other layers to avoid unravelling and unequal stretching, compressing the layers together under heavy pressure, die-pressing the compressed layers to the required form and then vulcanizing and subsequently trimming the vulcanized packing.

ROBERT HARRY THORNE.